UNITED STATES PATENT OFFICE.

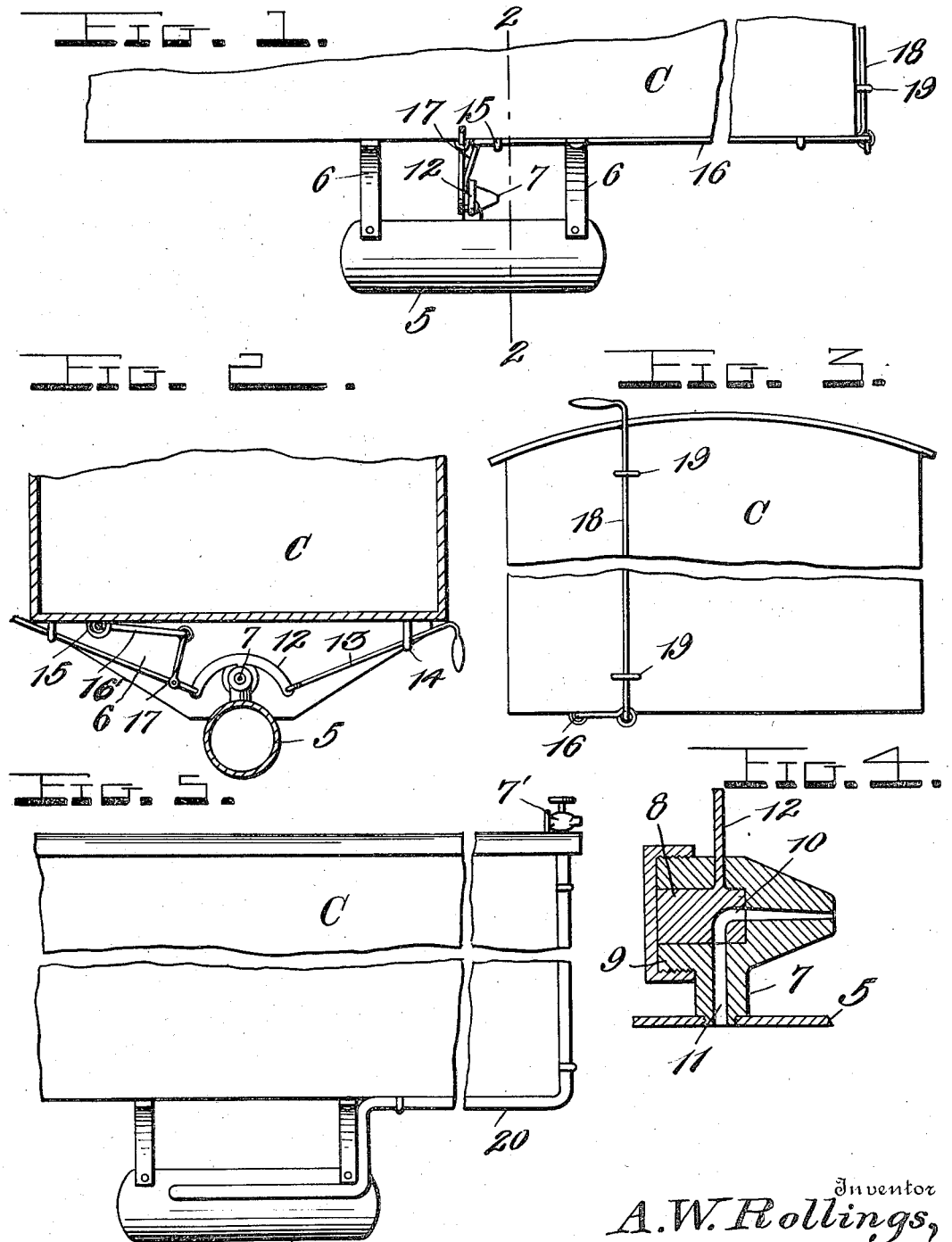

ALEX WOODS ROLLINGS, OF MONTGOMERY, ALABAMA, ASSIGNOR OF ONE-HALF TO MOSES J. POWELL, OF MONTGOMERY, ALABAMA.

AIR-BRAKE-RELEASE DEVICE.

1,001,985.  Specification of Letters Patent.  Patented Aug. 29, 1911.

Application filed May 3, 1911. Serial No. 624,783.

*To all whom it may concern:*

Be it known that I, ALEX WOODS ROLLINGS, a citizen of the United States, residing at Montgomery, in the county of Montgomery and State of Alabama, have invented certain new and useful Improvements in Air-Brake-Release Devices, of which the following is a specification, reference being had to the accompanying drawings.

This invention relates to air brake release devices and more particularly to air brakes of that character commonly employed on box or freight cars, the object of the invention being to provide a release device whereby the air from the reservoir of the brake system may be bled therefrom from the side or top of the car.

A further object of the invention resides in the provision of very simple and efficient means for opening the release valve or bleed cock in the event that the brakes stick when pressure is increased in the train line, so that the brakes fail to release.

With the above and other objects in view, the invention consists of the novel features of construction, combination and arrangement of parts hereinafter fully described and claimed, and illustrated in the accompanying drawings, in which—

Figure 1 is a side elevation of a release device for air brakes embodying my improvements; Fig. 2 is a section taken on the line 2—2 of Fig. 1; Fig. 3 is an end view of a car showing the vertical release rod extending to the top thereof; Fig. 4 is a detail section of the release valve or bleed cock; and Fig. 5 is a side elevation showing a slightly modified form of the invention.

Referring in detail to the drawing 5 designates the air drum or reservoir which is mounted beneath the car C, spaced transverse bars or beams 6 being secured to the bottom of the car to which the drum is attached at its opposite ends.

A release valve or bleed cock 7 is secured in the wall of the drum or reservoir 5 and consists of a rotary valve member 8 arranged within a suitable casing 9. This valve member is provided with the port 10 which is adapted to register with the exhaust passage 11 in the valve casing to bleed the air from the drum or reservoir 5. Upon the rotary valve member 8 the oppositely extending arms 12 are formed, said arms being transversely disposed with relation to the car C. To the end of each of said arms the inner end of a transversely extending release rod 13 is loosely connected, the outer end of said rod extending through a suitable support 14 fixed to the bottom of the car and having a handle formed thereon disposed beyond the side of the car whereby said rod may be actuated to rotate the valve member 8 and open the bleed cock.

Upon the bottom of the car and adjacent one side thereof, a longitudinally disposed rod or shaft 16 is rotatably mounted in suitable bearings 15. Each end of this rod has a crank arm 16' formed thereon, which is transversely disposed beneath the car, one of said crank arms being disposed beyond the end of the car. The crank on the inner end of the rod 16 is connected by means of a link 17 with the other of the rods 13 connected to the rotary valve member 8. A vertically movable release rod 18 is slidably mounted in bearings 19 fixed to the end of the car, and the lower end of said rod is loosely connected to the crank arm 16' on the end of the rod or shaft 16. The upper end of this vertically disposed release rod extends above the top of the car and is provided with a suitable handle by means of which it is adapted to be actuated.

By means of the arrangement of parts as above described, it will at once be seen that the release valve or bleed cock may be opened from the top of the car while the same is in motion. In air brake systems of the character now generally used, it is necessary to stop the train and for the trainman to descend and bleed the air from the reservoir by suitable means arranged upon the side of the car. With my device, however, it is unnecessary to stop the train or for the operator to descend from the top of the car, as the release valve may be readily opened by simply forcing the release rod 18 downwardly, thereby rotating the longitudinal rod or shaft 14 and, through the medium of the link 17 thereby transmit such rotary movement to the valve member 8. Thus the release valve may be easily and quickly opened in the event that the brake should become stuck so that the release of the same is assured and undue wear of the truck wheels eliminated.

In Fig. 5 of the drawings I have disclosed a slightly modified form of the invention wherein the pipe 20 is employed, said pipe being suitably mounted upon the bottom and one end of the car and connected to the air drum or reservoir 5'. The release valve or bleed cock 7' is arranged upon the upper end of this pipe which is disposed above the top of the car. Thus it will be readily seen that when it is desired to reduce the pressure in the reservoir, the valve 7' may be easily and quickly opened from the top of the car. This form of the invention is extremely simple, inexpensive and very efficient in practical operation.

From the foregoing it is thought that the construction and arrangement of the various parts and the manner in which the device operates will be readily understood.

The invention is applicable to any of the various air brake systems and can be installed at a minimum expense. Owing to the fact that but few elements are employed in the construction, it will further be obvious that the device is extremely durable and positive in its operation.

While I have shown and described the preferred construction and arrangement of the various parts, it will be understood that the device is susceptible of considerable modification without departing from the essential feature or sacrificing any of the advantages of the invention.

Having thus described the invention what is claimed is:—

1. The combination with a car provided with an air brake and an air reservoir, of a bleed cock for said reservoir including a rotary valve member having oppositely extending arms formed thereon transversely disposed beneath the car, transversely disposed release rods loosely connected to said arms and extending beyond opposite sides of the car, a longitudinally disposed rod rotatably mounted upon the bottom of the car having a crank formed upon each of its ends, one of said cranks being disposed beyond the end of the car, a link connecting the other crank to one of said transversely disposed rods adjacent its point of connection to the arm of the valve member, and a vertically disposed release rod connected to the first named crank and extending above the top of the car, substantially as and for the purpose specified.

2. The combination with a car provided with an air brake and an air reservoir, of a bleed cock for said reservoir including a rotary valve member having oppositely extending arms formed thereon, a transversely disposed release rod loosely connected to one of said arms and extending beyond one side of the car, a longitudinally disposed rod rotatably mounted upon the bottom of the car having a crank formed on each end, a link connection between one of said cranks and the other arm of said valve member, and a vertically disposed release rod connected to the other of said cranks and extending above the top of the car, substantially as and for the purpose specified.

In testimony whereof I hereunto affix my signature in the presence of two witnesses.

ALEX WOODS ROLLINGS.

Witnesses:
EFFIE TURNIPSEED,
J. R. THOMAS.